May 5, 1936. B. C. ROEHRL 2,039,553
EMERGENCY BRAKE AND GEAR SHIFT CONTROL
Filed May 25, 1933
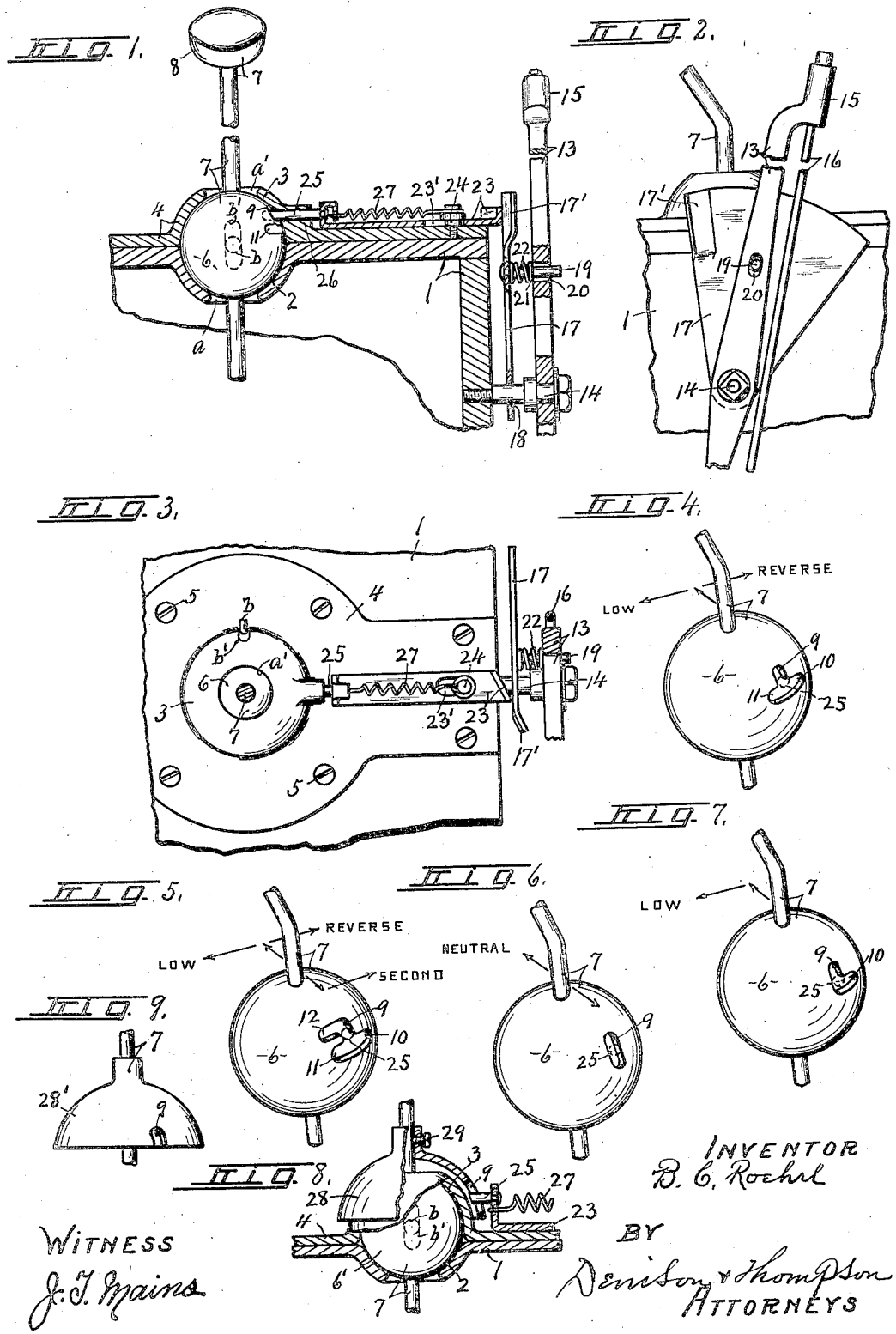

Patented May 5, 1936

2,039,553

UNITED STATES PATENT OFFICE 2,039,553

EMERGENCY-BRAKE AND GEAR-SHIFT CONTROL

Bruno C. Roehrl, Binghamton, N. Y.

Application May 25, 1933, Serial No. 672,819

4 Claims. (Cl. 192—4)

This invention relates to a device for controlling the operation of the speed-changing element of a variable-speed power-transmitting mechanism as applied more particularly to the operation of motor vehicles and other machines having an emergency brake or equivalent motion-retarding means under the control of the operator.

In motor-driven road vehicles, it is customary to provide a variable speed and reverse-drive power-transmitting mechanism and a suitable emergency brake mechanism with separate control levers therefor adapted to be operated at will, and it frequently happens that the gear-shifting lever will be adjusted to its driving position while the brake-lever is inadvertently left in its braking position, resulting in excessive wear or burning of the brake-band or shoes and drum engaged thereby, waste of power and fuel, and unnecessary strain upon the motor and other driving elements, in case the propulsion of the vehicle should continue for any appreciable time with the emergency brake in its braking position.

The main object of the present invention is to provide simple and efficient means for preventing the adjustment of the gear-shifting lever from its neutral position to one or more driving positions while the emergency brake lever is in its braking position and thereby to avoid the objectionable results mentioned, and at the same time, to allow the shifting lever to be adjusted from any driving position to its neutral position and, in some instances, to other driving positions without interfering with the free return of the brake lever to its neutral position at will.

Other objects and uses relating to specific parts of the device will be brought out in the following description.

In the drawing:—

Figure 1 is a longitudinal vertical sectional view, partly in elevation and partly broken away, of portions of the supporting-standard for the gear shifting lever of a motor vehicle together with a portion of the emergency brake-operating lever and the means actuated by the brake lever for locking the gear-shifting lever against adjustment to one or more of its driving positions, the locking bolt for the shifting lever being shown in its operative position.

Figure 2 is a side elevation of the mechanism shown in Figure 1.

Figure 3 is a top plan of the same mechanism.

Figure 4 is a perspective view of the ball and adjacent portions of the gear-shifting lever in which the opening in the ball is adapted to cooperate with the locking bolt for preventing the adjustment of the shifting lever to either its intermediate speed or high speed driving positions when the brake lever is in its braking position, and at the same time to permit adjustment of the gear shifting lever from its neutral position to either its low speed or reverse driving position and return.

Figure 5 is a perspective view similar to Figure 4, except that the opening in the ball is arranged to cooperate with the locking bolt for preventing the adjustment of the shifting lever to its high speed driving position when the brake lever is in its braking position, and at the same time permitting adjustment of the shifting lever to all other driving positions except at high speed.

Figure 6 is a perspective view similar to Figure 4 in which the opening in the ball is arranged to cooperate with the locking bolt to prevent adjustment of the gear-shifting lever from its neutral position to any of its driving positions when the braking lever is in its braking position.

Figure 7 is a perspective view similar to Figure 4 in which the opening in the ball is arranged to cooperate with the locking bolt to prevent adjustment of the shifting lever to any one of its intermediate speed, high speed, or reverse driving positions when the brake lever is in its braking positions, while at the same time permitting said shifting lever to be adjusted from its neutral position to its low speed drive position.

Figure 8 is a detail sectional view of the ball bearing socket for the gear-shifting lever showing a hemi-spherical member secured to the lever and provided with any one of the openings shown in Figures 4 to 7 inclusive, to cooperate with the locking bolt for holding the shifting lever against adjustment from its neutral position into one or more of its driving positions when the brake lever is in its braking position, the hemi-spherical member being a modified form of this part of the locking means instead of forming the openings directly in the ball of the shifting lever.

Figure 9 is a side elevation of the portion of the gear-shifting lever showing a further modified form of spherical cap section for the ball joint.

In order that the invention may be clearly understood, I have shown a portion of an upright standard 1 which may form a part of the gear case or housing for any standard type of variable speed power transmitting mechanism, as commonly used in motor-driven vehicles, the top of the standard 1 being shown as provided with a hemi-spherical socket 2, cooperating with a superposed hemi-spherical socket 3, the latter forming a part of a cap section 4 which may be releasably secured by bolt 5 or equivalent fastening means to the top of the standard 1, as shown more clearly in Figures 1 and 2.

The hemi-spherical sockets 2 and 3 form a complete spherical socket or bearing in which is journaled the ball member 6 of a gear shifting lever 7 which is adapted to be adjusted from its neutral position in different directions about the center of the spherical socket in the usual manner as may be required for shifting the gears, not shown, to different positions for low speed, intermediate speed, high speed, and reverse drive and return to neutral position, said lever having its upper end provided with the usual handle 8 by which it may be operated.

The ball 6 may be made in the form of a hollow shell or solid, but, as shown in Figures 1 to 4 inclusive, is provided with a T-shaped slot or opening in its periphery, preferably in a horizontal plane above that of the center of the ball to form a plurality of, in this instance three, branch slots 9, 10 and 11, communicating with each other at their junctions, the branch slot 9 being extended vertically from and substantially midway between the branch slots 10 and 11.

For convenience of description, these branch slots 9, 10 and 11 may be termed respectively the neutral slot, the low speed drive branch slot, and the reverse drive branch, the purposes of which will be hereinafter more fully described.

The form of this slot or opening may, however, be modified according to the requirements of the user, as for example in Figure 5, the same branches 9, 10 and 11 are shown, while the upper end of the branch 9 is provided with a lateral branch opening 12 which, for convenience of description, may be termed the second-speed drive-slot.

In Figure 6, however, I have shown only the neutral slot 9 to prevent the operation of the shifting lever from its neutral position to any one of the forward drive or reverse drive positions when the brake lever is in its braking position.

In Figure 7, the slot or opening includes the branches 9 and 10 only, the function of which will be hereinafter more fully explained.

In Figures 1, 2 and 3, I have shown an emergency brake-operating lever 13 as journaled intermediate its upper and lower ends upon a pivotal bolt 14 which, in this instance, is secured to one of the upright sides of the standard 1 to permit it to be rocked forwardly and rearwardly in the usual manner, the upper end of said lever being provided with a handle 15 by which it may be operated.

This handle is preferably hollow or tubular and forms a guide for a pawl-operating link or rod 16 which may be connected in the usual manner to a suitable pawl, not shown, cooperating with a toothed rack or equivalent member for holding the brake lever 13 in its adjusted position.

This brake lever 13 extends upwardly from its pivotal bolt 14 some distance above the top of the standard 1 in spaced relation to the adjacent side of the standard for receiving a cam plate 17 having its lower end provided with an opening 18 for receiving the adjacent portion of the pivotal bolt 14.

That is, the cam plate 17 is pivotally mounted upon the pivotal bolt 14 to move forwardly and rearwardly in the space between the lever 13 and adjacent side of the standard 1, said plate being extended upwardly a relatively short distance above the top of the standard and is provided at its uper end with a cam 17' as shown more clearly in Figures 1, 2 and 3.

The opening 18 for the pivotal bolt 14 is slightly larger than the diameter of the bolt to permit said cam plate to move axially of the pivotal bolt in addition to its rocking movement about the axis of said bolt for a purpose presently described.

A pin 19 is secured to the cam plate 17 at a point between the pivotal bolt 14 and cam 17' to extend outwardly through an opening 20 in the brake-operating lever 13, as shown more clearly in Figures 1 and 2, the opening 20 being of slightly greater vertical length than the diameter of the pin 19 to permit slight inward and outward rocking movement of the plate 17 lengthwise of the pivotal bolt 14.

A washer or equivalent shoulder 21 is loosely mounted upon the pin 19 to bear against the inner face of the brake lever 13 and also to form a seat for one end of a stiff coil spring 22 having its other end abutting against the outer face of the plate 17 and thereby to exert inward pressure upon the cam plate.

A locking plate 23 is slidably mounted upon the upper face of the cap section 4 of the standard 1 and is held against vertical displacement by a guide bolt or screw 24 enaged in a threaded aperture in the top plate 4 and extending through a lengthwise slot 23' in the plate 23.

The inner end of the plate 23 is provided with a locking bolt 25 rigidly secured thereto and preferably guided in an opening 26 in the top plate 4 or rather in one side of the socketed portion 3 of the top plate 4, as shown more clearly in Figures 1 and 3.

A tension spring 27 of the coil type has one end attached to the upper end of the guide screw or bolt 24 and its other end attached to the inner end of the plate 23 for normally drawing the slide plate and its bolt 25 outwardly.

This slide plate is disposed in substantially the same horizontal plane as the cam portion 17' of the cam plate 17 and has its outer end normally disposed in the transverse vertical plane of said cam to be engaged thereby when the brake lever 13 is moved to its braking position.

It is now clear that when the brake lever is rocked forwardly and rearwardly about the axis of the pivot 14, it will effect a corresponding rocking movement of the cam plate 17 through the medium of a pin 19 and that when the brake lever 13 and cam lever are in their extreme forward inoperative positions, the slide plate 23 and its bolt 25 will have been withdrawn outwardly by the spring 27, thus bringing the outer end of the slide plate 23 into the path of movement of the cam 17' of the plate 17.

Under these conditions the locking bolt 25 will be withdrawn by the spring 27 out of engagement with the ball 6 of the shifting lever 7, thus permitting the latter to be operated in the usual manner from its neutral position to any one of its forward or reverse drive positions for effecting a corresponding shifting of the transmission gears, not shown.

On the other hand, if the shifting lever 7 is in its neutral position the peripheral slot 9 in the ball 6 will be alined with the locking bolt 25. Then, if the brake lever 13 is rocked rearwardly from its neutral position to its braking position, it will cause a corresponding rocking movement of the cam lever 17, thus causing the cam 17' to engage the outer end of the sliding plate 23 for forcing the same inwardly against the action of the spring 27 and thereby causing the locking bolt 25 to enter the registering slot 9 in the ball 6 substantially midway between the lower and upper ends of the slot, as shown in Figure 1 and by dotted lines in Figures 4 to 7 inclusive.

Now, if the brake lever 13 remains in its braking position and the slot or opening 9 in the ball 6 is similar to that shown in Figures 1 and 4, the upper end of the shifting lever 7 may be rocked laterally in opposite directions from its neutral position through substantially equal arcs while the locking pin 25 is still engaged in the opening 9 preparatory to rocking the shifting lever forwardly or rearwardly to its preselected driving position, in this instance either the low speed position or reverse drive position, as determined by the branches 10 and 11 of the slot 9.

For example, if the upper end of the shifting lever has been rocked toward the left hand of Figure 1, it will move the lower end of the slot 9 into registration with the adjacent end of the locking pin 25 and then if the upper end of the shifting lever is rocked rearwardly for low or first-drive speed, it will register the branch slot 10 with the locking pin 25, and inasmuch as the width of the slots 9, 10 and 11 are only slightly greater than the diameter of the locking bolt, it is evident that the shifting lever will be held in its adjusted position against accidental returning or until returned by hand to its neutral position.

Again, assuming that the shifting lever 13 is in its neutral position and that the brake lever 13 is in its braking position, and it is desired to operate the shifting lever to its reverse drive position under which conditions the shifting lever will be rocked laterally as usual to bring the branch slot 11 into registration with the locking pin 25, whereupon a forward movement of the shifting lever will cause the locking pin to enter the branch slot 11 to hold the lever in its adjusted position until returned at will to its neutral position.

If the slot 9 is straight, as shown in Figure 6 and substituted for that shown in Figures 1 to 4 inclusive, it is evident that the shifting lever will be capable of lateral rocking movement in opposite directions, but would be incapable of forward and rearward rocking movement by reason of the engagement of the walls of the slot with the locking pin 25, said slot and walls constituting a keeper for receiving the locking pin thus preventing the operation of the shifting lever to any of its driving positions as long as the brake lever 13 remains in its braking position.

When the slot 9 is of the form shown in Figures 1 to 4 inclusive, the shifting lever 7 may be adjusted from its neutral position to its low speed drive or reverse drive positions, the object of which is to assist in holding the vehicle against accidental movement on grades or even on level places when desired as a safety measure to prevent accidental or malicious moving of the vehicle in case the brake should fail to serve its purpose when set.

The slot 9, shown in Figure 7, is similar to that shown in Figure 4, except that the branch 11 is omitted, thus permitting the gear-shifting lever 7 to be shifted from its neutral position to its low speed drive position when the brake lever 13 is in its braking position, but preventing the movement of the gear shifting lever into any other forward or reverse drive positions.

The slot or opening 9, shown in Figure 5, is also somewhat similar to that shown in Figure 4, except that it is provided with the extra branch slot 12 at its upper end, thus permitting the gear-shifting lever 7 to be moved from its neutral position to an intermediate speed driving position and also to its low speed and reverse drive positions when the brake lever 13 is in its braking position, as shown in Figures 1 and 2.

In the modification shown in Figure 8, the gear shifting lever 7 may be of the usual construction in that it is provided with a ball member as 6' journaled in the spherical socket members 2 and 3 to permit the lever to operate in the usual manner for shifting the gears to different speeds for forward and reverse drive.

The peripheral slots or openings 9, 10, 11 and 12 are, however, omitted and the functions thereof are performed by means of a hemi-spherical cap section 28 which is secured by releasable means such as a set screw 29 to the shifting lever 8 concentric with the center of the ball 6', and may be provided with any one of the slots or openings 9, shown in Figures 4, 5, 6 or 7, to cooperate with the locking bolt 25 in the manner previously explained for preventing the operation of the gear-shifting lever from its neutral position to any one or more of its forward drive or reverse drive positions when the brake lever 13 is in its braking position.

It is, of course, to be understood that the openings as —a— and —a'— in the lower side of the socket 2 and upper side of the socket 3 will be sufficiently large to permit the necessary angular adjustment of the gear-shifting lever to its various driving positions and that the ball members 6 or 6' may be provided with the usual radial guide pin or pins b at right angles to the shank of the lever 7 adapted to move in vertical slots b' in the front and rear walls of the sockets 2 and 3, as shown by dotted lines in Figures 1, 3 and 8 to hold the lever against turning about its vertical axis without in any way interfering with its free lateral tilting movement for gear shifting purposes.

*Operation*

When the brake lever 13 is in its normal or inoperative position, the cam 17' of the plate 17 will also be out of alinement with the adjacent end of the slide plate 23, thus allowing the latter to be withdrawn outwardly by the spring 27 for withdrawing the bolt 25 from the peripheral slot in the ball 6, Figures 1 to 7 inclusive, or from the section 28, Figure 8.

Under these conditions the gear-shifting lever may be operated from its neutral position to its various driving positions and returned in the usual manner without in any way interfering with the free operation of the brake lever.

On the other hand, if the brake lever is adjusted to its braking position, the cam plate 17 will be similarly adjusted thereby causing its cam 17' to ride against the adjacent inclined end of the slide plate 23 for forcing the latter inwardly against the action of the spring 27 to engage the bolt 25 in the registering peripheral slot in the ball 6, it being understood that the compression spring 22 between the plate 17 and brake lever 13 will be sufficient to overcome the tension of the spring 27 during this locking movement.

If the peripheral slot as 9 in the ball 6 or cap section 28 is of the construction shown in Figure 6, the engagement of the locking bolt 25 therein will allow the gear-shifting lever 7 to be moved laterally in its neutral position, but will prevent movement of the shifting lever to either of its driving positions thereby preventing the operation of the vehicle while the emergency brake is set.

In case the slot 9, shown in Figure 7, is used while the locking bolt 25 is engaged therein, the gear-shifting lever 7 may be moved laterally in its neutral position and may also be shifted to its low speed driving position only.

If the construction of slot shown in Figure 4 is used while the locking bolt 25 is engaged therein, the shifting lever 7 may be moved laterally in its neutral position and may also be moved either to its low drive position or to its reverse drive position as previously explained.

In case the construction of slot shown in Figure 5 should be used while the locking bolt 25 is engaged therein, the shifting lever 7 may be moved laterally in its neutral position and may also be adjusted to different drive positions for low speed, second speed and reverse drive, but cannot be shifted to its high speed drive position. In other words, when the locking bolt 25 is engaged in either of the slots shown in Figures 4 to 8 inclusive, the gear shifting lever cannot be moved to its high speed position as long as the brake lever 13 remains in its braking position, thus preventing the objectionable results of driving at high speed when the brake is set or even partially set.

It will be noted, however, that these objectionable results from driving with the brake in its braking position can be further reduced or entirely eliminated by the use of one or the other of the slots shown in Figures 4, 5, 7 and 8. It will also be noted that in case it should be necessary to apply the emergency brake while the gear-shifting lever is in any one of its driving positions, the corresponding movement of the cam plate 17 against the outer end of the slide plate 23 would cause said cam plate to move outwardly against the action of the spring 22 until the gear-shifting lever is restored to its neutral position at which time the locking bolt 25 would be forced into the registering slot 9 by the action of the then compressed spring 22.

The brake lever 13 may then be returned to its normal position to allow the locking bolt 25 to be withdrawn by the spring 27.

The construction shown and described is particularly simple and highly efficient, but obviously various changes may be made in the detail construction without departing from the spirit of the invention.

For example, the radial or axial depth of the spherical segment 28' may be shortened to less than that of the hemisphere by cutting away its lower edge at right angles to the axis of the lever 7 so that when the lever is in its normal position the lower edge will be disposed in about the same horizontal plane as the lower face of the locking pin 25, thereby cutting away the lower part of the slot 9 leaving the upper part thereof open at the bottom for engagement with the locking bolt when the latter is in its locking position to prevent shifting of the lever 7 to any driving position, as shown in Figure 9.

What I claim is:

1. In an emergency-brake and gear-shift control, a gear-shifting member movable in different directions about a relatively fixed center and having a portion thereof concentric with said center and provided with a peripheral slot, a locking member adapted to enter the slot only when the first member is in its neutral position, a brake-operating member, and means actuated by the movement of the last named member to its brake-applying position for forcing the locking member into the slot and thereby to prevent the movement of the first member to its gear-shifting position.

2. In an emergency-brake and gear-shift control, a gear-shifting member movable in different directions about a relatively fixed center and having a portion thereof concentric with said center, and provided with a peripheral opening, a locking member adapted to enter the opening when the first member is in its neutral position for restricting the movement of said first member, a brake-operating member, and means actuated by the movement of the last named member to its brake-applying position for forcing the locking member into the opening, said opening being elongated in one of said directions to permit a limited movement of the first member while the locking member remains in the opening.

3. In an emergency-brake and gear-shift control, a gear-shifting member movable in different directions about a relatively fixed center and having a portion thereof concentric with said center and provided with a peripheral slot, a locking member adapted to enter the slot only when the first member is in its neutral position, a brake-operating member, and means actuated by the movement of the last named member to its brake-applying position for forcing the locking member into the slot, said slot having a laterally extending branch slot for receiving the locking member and thus permitting the first member to be moved from its neutral position to a gear-shifting position.

4. In an emergency-brake and gear-shift control, a gear-shifting member movable laterally in at least one direction from a neutral position about a relatively fixed center and having a portion thereof concentric with said center and provided with a peripheral slot elongated in the direction of movement, a locking member movable into and out of said slot, a brake-operating member, and means actuated by the movement of said brake-operating member to its brake-applying position for forcing the locking member into said slot while the gear-shifting member is in its neutral position to prevent movement of the gear-shifting member to any one of its driving positions.

BRUNO C. ROEHRL.